(12) United States Patent
Takafuji et al.

(10) Patent No.: US 10,994,205 B2
(45) Date of Patent: May 4, 2021

(54) INFORMATION PROCESSING APPARATUS, ARRANGEMENT METHOD, AND ARRANGEMENT PROGRAM

(71) Applicant: KOEI TECMO GAMES CO., LTD., Kanagawa (JP)

(72) Inventors: Yuishin Takafuji, Kanagawa (JP); Hisakazu Kajiwara, Kanagawa (JP)

(73) Assignee: KOEI TECMO GAMES CO., LTD., Kanagawa (JP)

( * ) Notice: Subject to any disclaimer, the term of this patent is extended or adjusted under 35 U.S.C. 154(b) by 43 days.

(21) Appl. No.: 16/507,328

(22) Filed: Jul. 10, 2019

(65) Prior Publication Data

US 2020/0038756 A1 Feb. 6, 2020

(30) Foreign Application Priority Data

Aug. 3, 2018 (JP) .............................. JP2018-147117

(51) Int. Cl.
*A63F 13/577* (2014.01)
*A63F 13/56* (2014.01)
*A63F 13/60* (2014.01)

(52) U.S. Cl.
CPC ............ *A63F 13/577* (2014.09); *A63F 13/56* (2014.09); *A63F 13/60* (2014.09)

(58) Field of Classification Search
CPC ......... A63F 13/577; A63F 13/56; A63F 13/60
USPC .......................................................... 463/31
See application file for complete search history.

(56) References Cited

U.S. PATENT DOCUMENTS

| 8,360,891 B2* | 1/2013 | Matsumura | A63F 13/56 463/43 |
| 2010/0249494 A1* | 9/2010 | Yoshizawa | A61B 5/02416 600/27 |
| 2014/0066195 A1* | 3/2014 | Matsui | A63F 13/42 463/30 |
| 2015/0099581 A1* | 4/2015 | Miyama | A63F 13/56 463/31 |
| 2015/0099582 A1* | 4/2015 | Hishinuma | A63F 13/56 463/31 |

FOREIGN PATENT DOCUMENTS

| JP | 2003-067780 | 3/2003 |
| JP | 3558288 | 8/2004 |
| JP | 2009-163770 | 7/2009 |

OTHER PUBLICATIONS

Japanese Office Action for 2018-147117 dated Aug. 27, 2019.
Japanese Office Action for 2018-147117 dated Dec. 10, 2019.

(Continued)

*Primary Examiner* — Allen Chan
(74) *Attorney, Agent, or Firm* — IPUSA, PLLC (57) ABSTRACT

An information processing apparatus including a specifying unit configured to specify areas in a virtual space, in which a character and an object are respectively arranged for each event in a game, a detection unit configured to detect an overlap between the area of the object and the area of the character, and an arrangement unit configured to rearrange the area of the character, in which the overlap is detected.

4 Claims, 11 Drawing Sheets

(56) References Cited

OTHER PUBLICATIONS

Kiyoshi Katoh, Mathematical Physics in Mathematics for 3D game programming: Play by moving, SHOEISHA, Mar. 17, 2015, First edition, First printing, pp. 171 to pp. 180, with English concise explanation.

Naoki Shimatani and 3 others, GPU Implementation of Food-Foraging Problem for Evolutionary Swarm Robotics Systems, Journal of Electric Engineers, Information and Systems, Sep. 1, 2014, vol. 134, No. 9, pp. 1355-1364, with English concise explanation.

Yuichiro Otsuki, Super authentic! 3D game programming classroom/C language: Learn by samples: Rutles Inc., Nov. 10, 2014, First Edition, First Printing, pp. 185 to 190, with English concise explanation.

* cited by examiner

| EVENT | B | | |
|---|---|---|---|
| EVENT | A | Da | Db |
| CHARACTER | | Ba | Bb |
| CHARACTER AREA | | $(x_1,y_1,z_1)-(x_2,y_2,z_2)$ | $(x_3,y_3,z_3)-(x_4,y_4,z_4)$ |
| OBJECT | | Ca | Cb |
| OBJECT AREA | | $(x_5,y_5,z_5)-(x_6,y_6,z_6)$ | $(x_7,y_7,z_7)-(x_8,y_8,z_8)$ |

INFORMATION PROCESSING APPARATUS, ARRANGEMENT METHOD, AND ARRANGEMENT PROGRAM

CROSS REFERENCE TO RELATED APPLICATIONS

This application is based on and claims priority to Japanese Patent Application No. 2018-147117, filed Aug. 3, 2018. The entire contents of Japanese Patent Application No. 2018-147117 is hereby incorporated by reference.

BACKGROUND OF THE INVENTION

1. Field of the Invention

This disclosure relates to an information processing apparatus, an arrangement method, and an arrangement program.

2. Description of the Related Art

It has been proposed to perform event playback such as drawing animations during games (see Patent Document 1).

RELATED ART DOCUMENT

Patent Document

[Patent Document 1] Japanese Unexamined Patent Application Publication No. 2003-67780

For example, when reproducing an event of an arbitrary cut scene during a game, it is desirable to avoid an unnatural movement such as an action of a character sinking into a wall or a building, etc., and to reproduce the event with a sense of immersion. In addition, it is desirable to increase a sense of exaltation of a player by avoiding the event to be reproduced from getting into a rut through real-time reproduction of the event performed during the game.

The present disclosure provides a technique for providing an appropriate action of a character during reproduction of an event in a game.

SUMMARY OF THE INVENTION

According to one aspect of the present disclosure, an information processing apparatus includes a specifying unit configured to specify areas in a virtual space, in which a character and an object are respectively arranged for each event in a game, a detection unit configured to detect an overlap between the area of the object and the area of the character, and an arrangement unit configured to rearrange the area of the character, in which the overlap is detected.

DETAILED DESCRIPTION OF EMBODIMENTS

Hereinafter, an embodiment for carrying out the present disclosure will be described with reference to the figures. In the present specification and figures, substantially the same parts in the configuration are attached with the same reference numerals without repeatedly describing the parts.

Functional Configuration of Information Processing Apparatus

Figure 1:
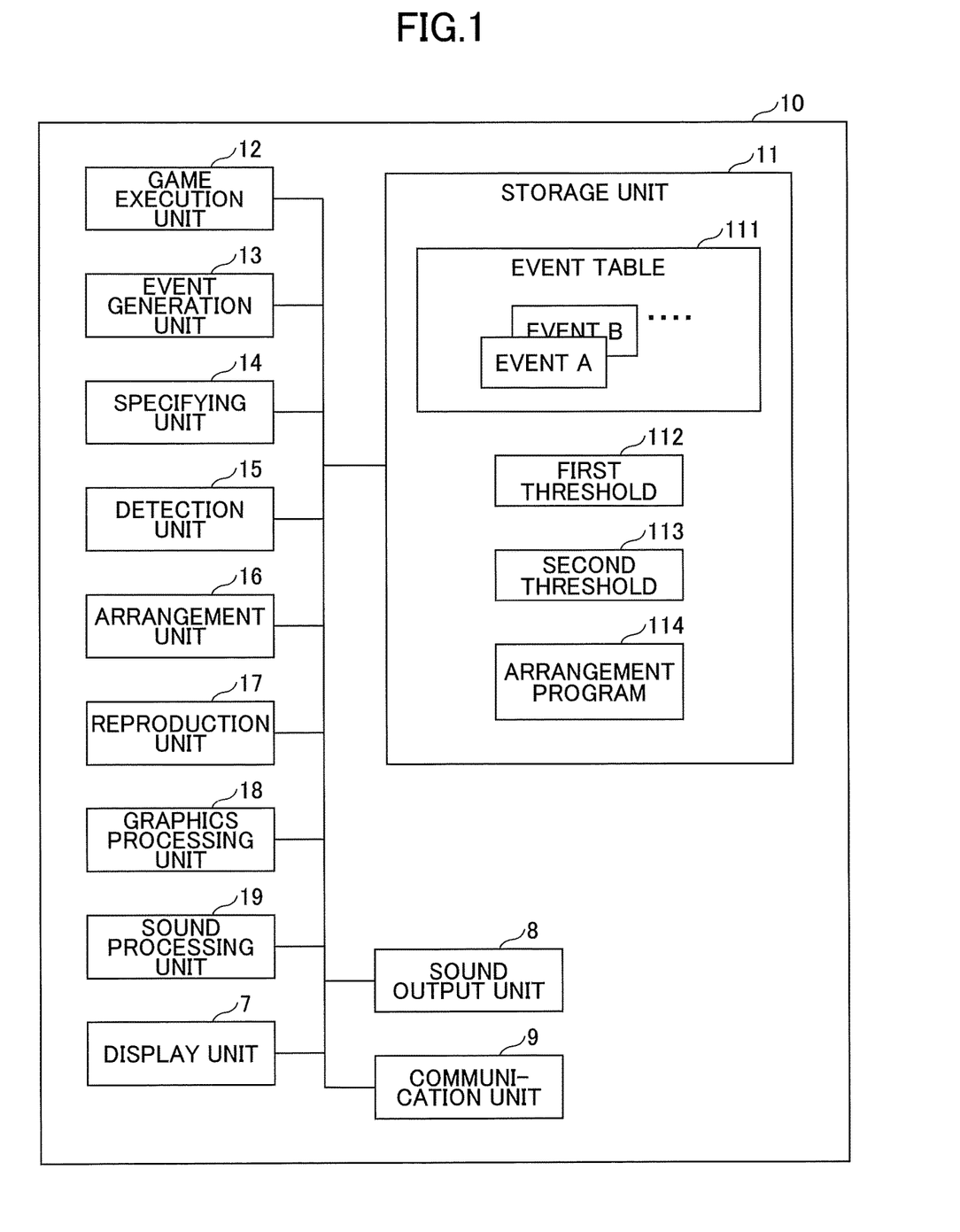
FIG. 1 illustrates an example of a functional configuration of an information processing apparatus according to one embodiment.

First, an example of the functional configuration of the information processing apparatus 10 according to one embodiment will be described with reference to FIG. 1. FIG. 1 illustrates an example of a functional configuration of the information processing apparatus 10 according to the embodiment. The information processing apparatus 10 according to the embodiment includes a storage unit 11, a game execution unit 12, an event generation unit 13, a specifying unit 14, a detection unit 15, an arrangement unit 16, a reproduction unit 17, a graphics processing unit 18, a sound processing unit 19, a display unit 7, a sound output unit 8, and a communication unit 9.

The storage unit 11 stores an event table 111, a first threshold 112, a second threshold 113, and the arrangement program 114. The event table 111 is a table in which characters, which appear for each event executed during a game, before and after the game starts, or before and after the game ends, and objects such as buildings to be drawn on a screen, etc., which appear for each event executed during a game, before and after the game starts, or before and after the game ends, are specified.

Figure 2:
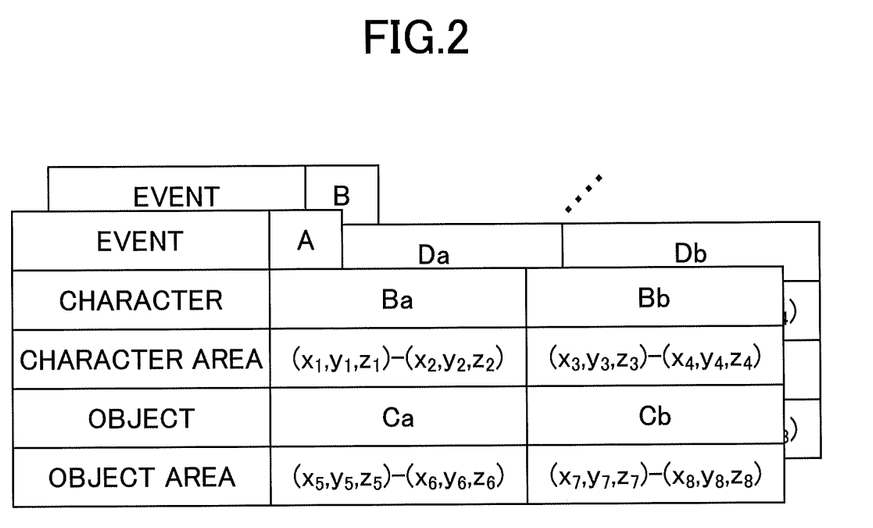
FIG. 2 illustrates an example of an event table according to the embodiment.

FIG. 2 illustrates an example of the event table 111 according to the embodiment. In FIG. 2, for example, a character, a character area, an object, or an object area drawn on the screen for each event is specified and stored.

In the event table 111, characters Ba and Bb that appear in an event "A" are specified. The character area is the range in which each character moves during the event and is indicated using a coordinate on a virtual space. In an event "A", objects Ca and Cb are arranged on the screen. Objects Ca and Cb are virtual spaces that obstruct an action of a character and may include, in addition to rendered objects such as walls, buildings, trees, etc., an action range of the virtual camera that is not rendered on the screen, and the like. The object area is a range of arranging the object if the object is dynamic, and an action range of the object so as to be indicated by the coordinate if the object is dynamic.

In the example of FIG. 2, a character area is defined for each character, but not limited thereto. A single character area may be defined for two or more characters, or two or more character areas may be defined for the single character.

Similarly, in the example of FIG. 2, an object area is defined for each object, but not limited thereto. A single object area may be defined for two or more objects, or two or more object areas may be defined for the single object.

Referring back to FIG. 1, the first threshold 112, the second threshold 113, and the arrangement program 114 are stored in the storage unit 11. The first threshold 112, the second threshold 113, and the arrangement program 114 will be described later.

The game execution unit 12 executes a game program stored in the storage unit 11 according to the operation of the player who plays the game and advances the game. When the game execution unit 12 receives the operation of the controller performed by the player, the game is caused to proceed accordingly. An operation performed by a player includes an operation to move a player character or to cause the player character to take a predetermined action such as an attack.

The event generation unit 13 determines the event to be executed during or before or after the game is executed and generates the event. The specifying unit 14 refers to the event table 111, specifies the area in which the characters and the objects are arranged on the virtual space for each event in the game. The number of events generated by the event generation unit 13 is not limited to one and may be multiple.

The detection unit 15 detects overlap between the object area and the character area. The arrangement unit 16 rearranges the character area in response to the state of overlap between the object area and the character area. The reproduction unit 17 plays the event when the character area does not overlap with the object area or when overlap is within an acceptable level after the rearrangement is completed.

When a drawing command is output from the game execution unit 12, the graphics processing unit 18 outputs a video signal to the display unit 7. Accordingly, the display unit 7 displays an image of the game according to the progress of the game. When the drawing command is output from the game execution unit 12, the animation such as a cut scene of a particular event is drawn in the display unit 7 according to the instruction.

When an instruction command of the sound output is output from the game execution unit 12, the sound processing unit 19 outputs a sound signal to the sound output unit 8. Accordingly, the sound output unit 8 outputs the sound of a character or other sound corresponding to the progress of the game. The communication unit 9 communicates with other devices.

The information processing apparatus 10 illustrated in FIG. 1 may be, for example, a personal computer, a tablet terminal, a home game terminal, a commercial game terminal, a mobile phone such as a smartphone, a portable game machine, or the like. The information processing apparatus 10 may be a wearable device such as a HMD (Head Mount Display), FMD (Face Mount Display), or a wristwatch type.

Hardware Configuration of Information Processing Apparatus

Figure 3:
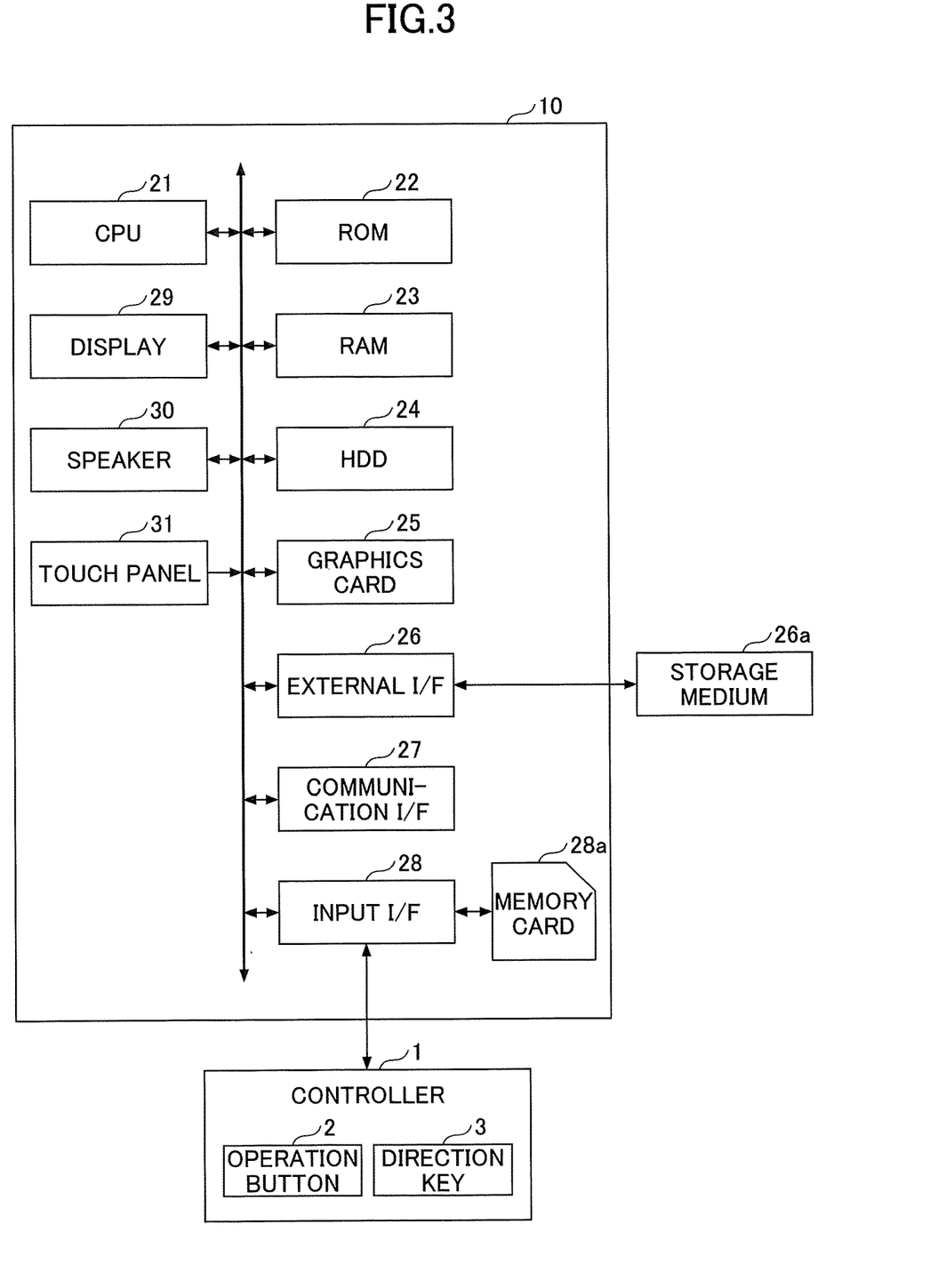
FIG. 3 illustrates an example of a hardware configuration of an information processing apparatus according to the embodiment.

Next, an example of the hardware configuration of the information processing apparatus 10 according to an embodiment will be described with reference to FIG. 3. FIG. 3 is a diagram illustrating an example of a hardware configuration of the information processing apparatus 10 according to the embodiment.

The information processing apparatus 10 according to the embodiment includes a CPU (Central Processing Unit) 21, a ROM (Read Only Memory) 22, a RAM (Random Access Memory) 23, and an HDD (Hard Disk Drive) 24. The information processing apparatus 10 also includes a graphics card 25, an external I/F 26, a communication I/F 27, an input I/F 28, a display 29, a speaker 30, and a touch panel 31. Each part is connected to each other by a bus.

The ROM 22 is a non-volatile semiconductor memory that can hold internal data even when powered off. The RAM 23 is a volatile semiconductor memory that temporarily holds the programs and data. The programs and data are stored in the ROM 22 and the RAM 23.

The HDD 24 is a non-volatile storage device that stores programs and data. The ROM 22, RAM 23, and HDD 24 may store a program of basic software for controlling the entire information processing apparatus 10, a game program, and an arrangement program 114.

The CPU 21 reads various programs and various data from the ROM 22 or the HDD 24 onto the RAM 23 and performs various processes, thereby realizing the entire control of the information processing apparatus 10 and the functions mounted in the information processing apparatus 10.

The external I/F 26 is an interface that connects the information processing apparatus 10 to an external device. The external device is, for example, a storage medium 26a. Accordingly, the information processing apparatus 10 can read and write the storage medium 26a through the external I/F 26. An example of the storage medium 26a is a CD (Compact Disk), a DVD (Digital Versatile Disk), an SD Memory Card (Secure Digital Memory Card), a USB memory (Universal Serial Bus memory), or the like.

For example, the information processing apparatus 10 may be equipped with the storage medium 26a in which a game program or an arrangement program 114 is stored. The game program or the arrangement program 114 is read out by the external I/F 26 and read into the RAM 23.

The CPU 21 processes the game program and the arrangement program 114 read into the RAM 23 and instructs the graphics card 25 to output an image according to the progress of the game and an image of the event. The graphics card 25 performs image processing of the game and the event, which are displayed on the screen according to the instruction, and causes the image of the game and event to be rendered on the display 29. One frame time of the image output from the graphics card 25 is, for example, 1/30 to 1/60 seconds. The graphics card 25 renders one image per frame. Said differently, 30 to 60 frame images are rendered per second.

The CPU 21 executes the processing of the arrangement program 114 loaded into the RAM 23, generates the event in the game, and renders the event. The rendering of the event may include animations of characters appearing in the game. During the event, a predetermined sound is output from the speaker 30 in conformity with the progress of the event. The communication I/F 27 is an interface that connects the information processing apparatus 10 to a network. The communication I/F 27 communicates with another device via a communication unit having an antenna.

The input I/F 28 is an interface connected to an input device such as the controller 1. The controller 1 has an operation button 2 and a direction key 3. The player operates the game using controller 1. For example, the player may have the player character perform a predetermined operation, such as attack or defense, or a predetermined processing, such as the start of a screen, by the combination of the operation of the operation button 2 and the direction key 3. The controller 1 may be integral with or separate from the body of the information processing apparatus 10. The controller 1 may also be removable from the body of the information processing apparatus 10. The controller 1 may also be provided in one or more ways.

The input I/F 28 stores the input information based on the input operation performed by the player using the controller 1 in the RAM 23. When the player instructs the start of the game by operating the controller 1, the input I/F 28 inputs the instruction information to execute the game processing.

The touch panel 31 is provided on the screen of the display 29 to detect the position of the information processing apparatus 10 touched by the player on the screen. As the touch panel 31, any one may be used, for example, an electrostatic capacitance method, a resistive film method, or the like. The touch panel 31 may not be mounted on the information processing apparatus 10. In the case of the information processing apparatus 10 equipped with the touch panel 31, the controller 1 may not be provided.

In the information processing apparatus 10 of such a configuration, the CPU 21 executes various processing related to the game according to the procedure of the game program. The input I/F 28 causes the data of the game stored in the RAM 23 to be stored in the memory card 28a according to the instruction from the CPU 21. The input I/F 28 reads out the game data stored in the memory card 28a at the time of interruption and transmits it to the RAM 23. In addition, at a predetermined timing, the CPU 21 performs a process of playing an action of a character determined for each event in accordance with the procedure of the arrangement program 114.

FIG. 1 is a block diagram illustrating a function, and each part represented by these functional blocks can be substantialized by the hardware illustrated in FIG. 3 as an example. For example, the function of the storage unit 11 of FIG. 1 can be substantialized by, for example, a ROM 22, a RAM 23, an HDD 24, or a storage device on a cloud connected to the information processing apparatus 10 via a network.

The function of receiving game operations using the controller 1 or the touch panel 31 by the player can be substantialized, for example, by the input I/F 28. The functions of the game execution unit 12, the event generation unit 13, the specifying unit 14, the detection unit 15, the arrangement unit 16, the reproduction unit 17, and the sound processing unit 19 can be substantialized, for example, by processing in which the game program or the arrangement program 114 executes the CPU 21.

The functions of the graphics processing unit 18 may be implemented, for example, by a graphics card 25. The function of the display unit 7 can be substantialized, for example, by a display 29. The function of the sound output unit 8 can be substantialized, for example, by a speaker 30.

The function of the communication unit 9 can be substantialized, for example, by communication I/F 27. For example, when the event table 111 stored in the storage unit 11 is stored in a storage device on a cloud different from the information processing apparatus 10, the communication unit 9 receives necessary information from the storage device on the cloud.

Arrangement Process when an Event Occurs

An event is generated in the game, an action of a character is played back in real time, and a sense of exaltation of the player is enhanced. At this time, it is necessary to secure an action range of the character so that the character is not buried in the wall or building.

Figure 4:
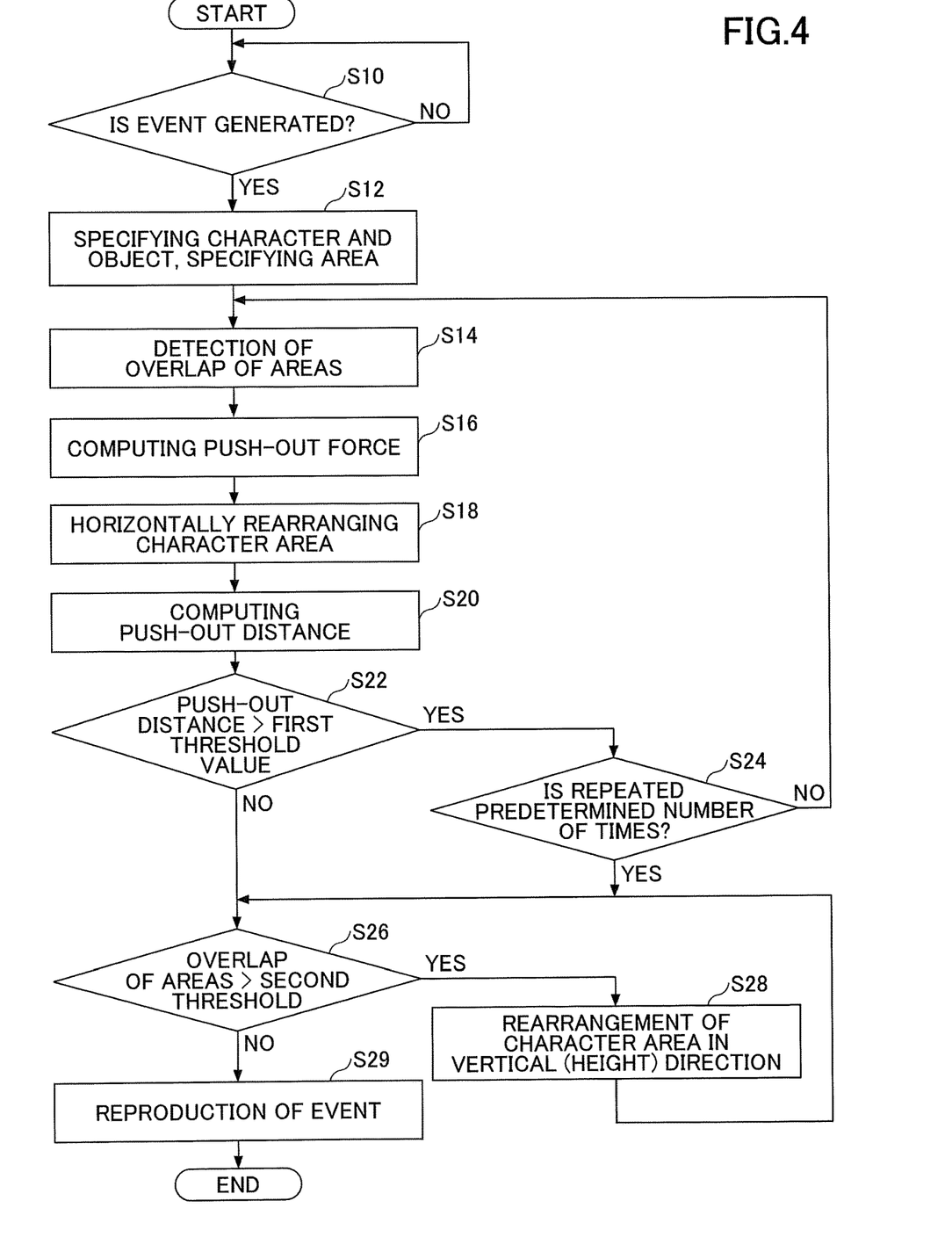
FIG. 4 is a flow chart illustrating an example of an arrangement process according to the embodiment.

Accordingly, an example of an arrangement process according to one embodiment executed when the event occurs in the game will be described with reference to FIG. 4. FIG. 4 is a flowchart illustrating an example of an arrangement process of a character area according to the embodiment.

When the present process starts, the event generation unit 13 determines whether the event occurs in accordance with the progress of the game (S10). When it is determined that the event occurs, the specifying unit 14 refers to the event table 111 to specify the character and the object corresponding to the event that occurs, and to specify the area and the object area of the specified character (S12).

Figure 5A:
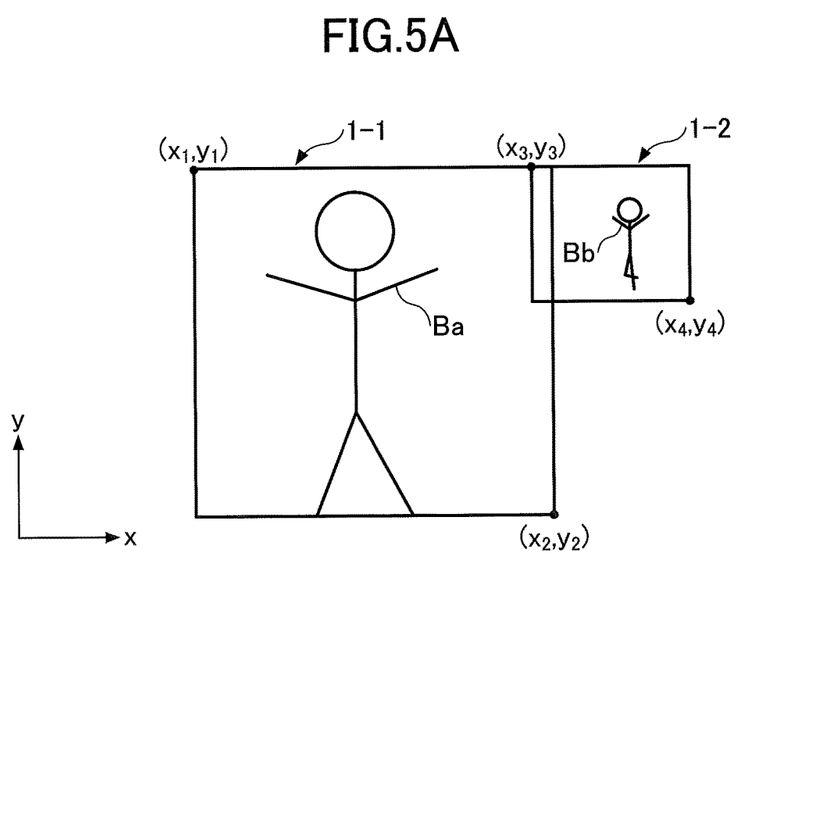
FIGS. 5A and 5B illustrate the arrangement process according to the embodiment.
Figure 5B:
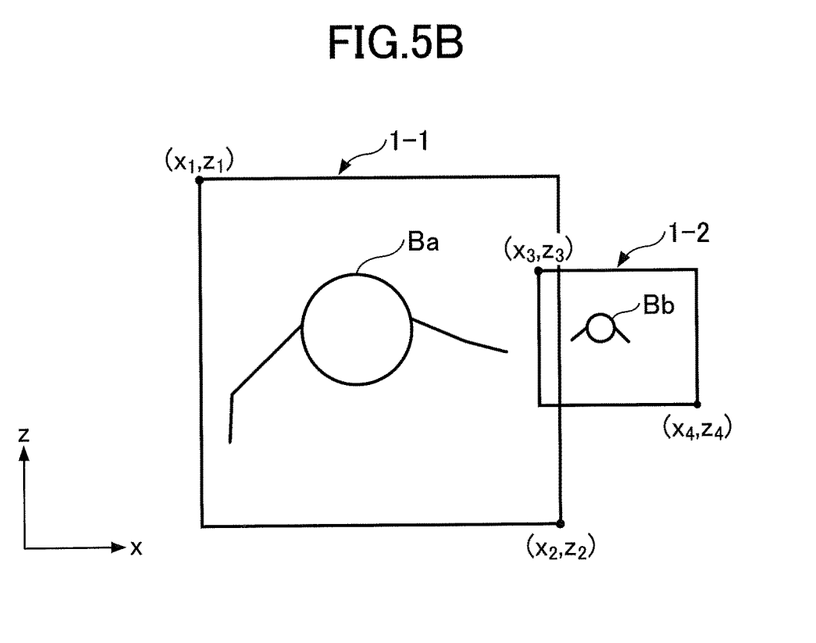

FIGS. 5A and 5B illustrate an example of the character areas of the characters Ba and Bb specified from the event table 111. FIG. 5A illustrates characters Ba and Bb, and character areas 1-1 and 1-2 respectively corresponding to the characters Ba and Bb, viewed in a lateral direction. FIG. 5B illustrates the characters Ba and Bb, and the character areas 1-1 and 1-2, viewed from the upper side. Hereinafter, horizontal planes are indicated by an x-axis and a z-axis, and vertical planes are indicated by the x-axis and a y-axis.

Figure 6A:
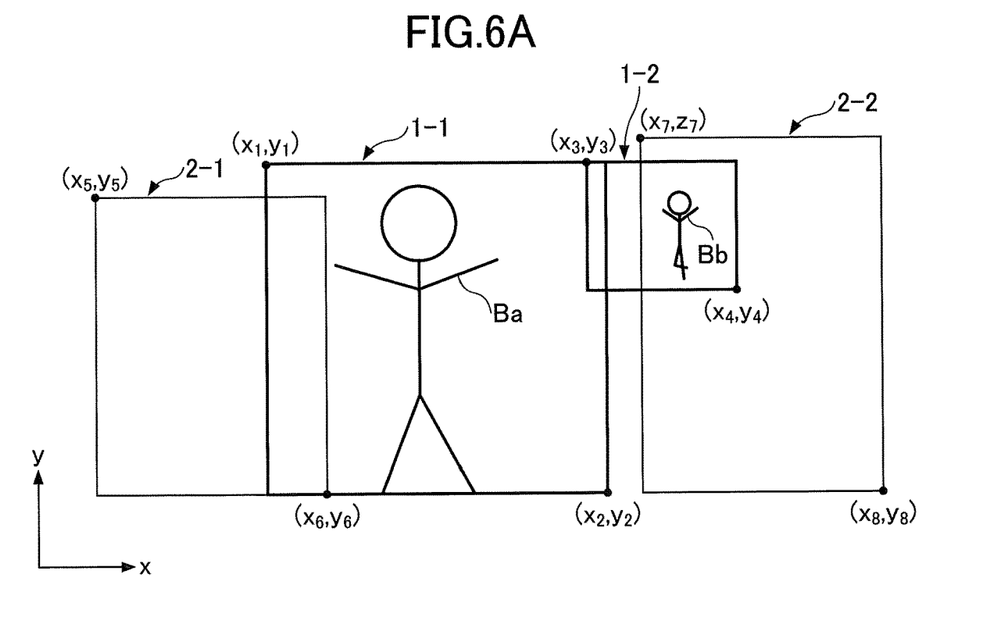
FIGS. 6A and 6B illustrate the arrangement process according to the embodiment.
Figure 6B:
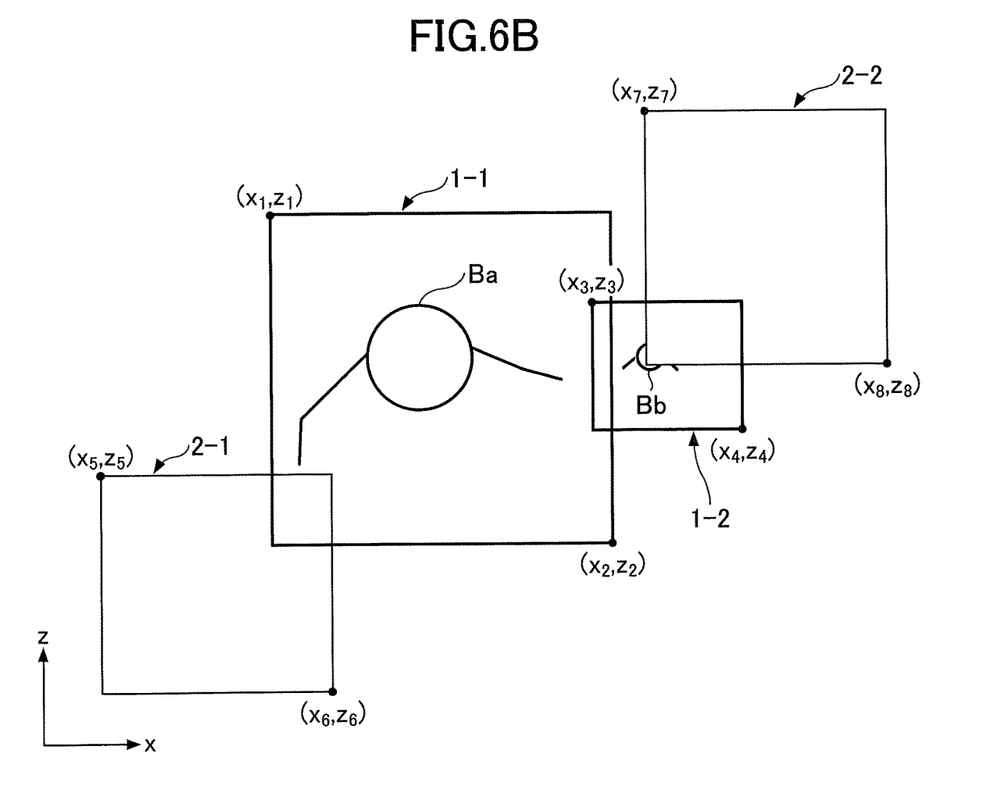

FIGS. 6A and 6B are diagrams of the character areas illustrated in FIGS. 5A and 5B, in which object areas corresponding to the objects Ca and Cb specified from the event table 111 are added. FIG. 6A illustrates the characters Ba and Bb, the character areas 1-1 and 1-2, and object areas 2-1 and 2-2, which are viewed from a lateral direction. FIG. 6B is viewed from the upper side of FIG. 6A.

Referring back to FIG. 4, the detection unit 15 detects overlap between the object area and the character area (S14). Next, the arrangement unit 16 calculates the push-out force of pushing the character area out of the object area (S16). For example, in FIG. 7A, push-out force F1 of pushing the character area 1-1 out of the object area 2-1 and push-out force F2 of pushing the character area 1-2 out of the object area 2-2 are illustrated as an example. The push-out force F1 and push-out force F2 have the greatest force to push the character areas 1-1 and 1-2 out of the object areas 2-1 and 2-2, respectively.

Figure 7A:
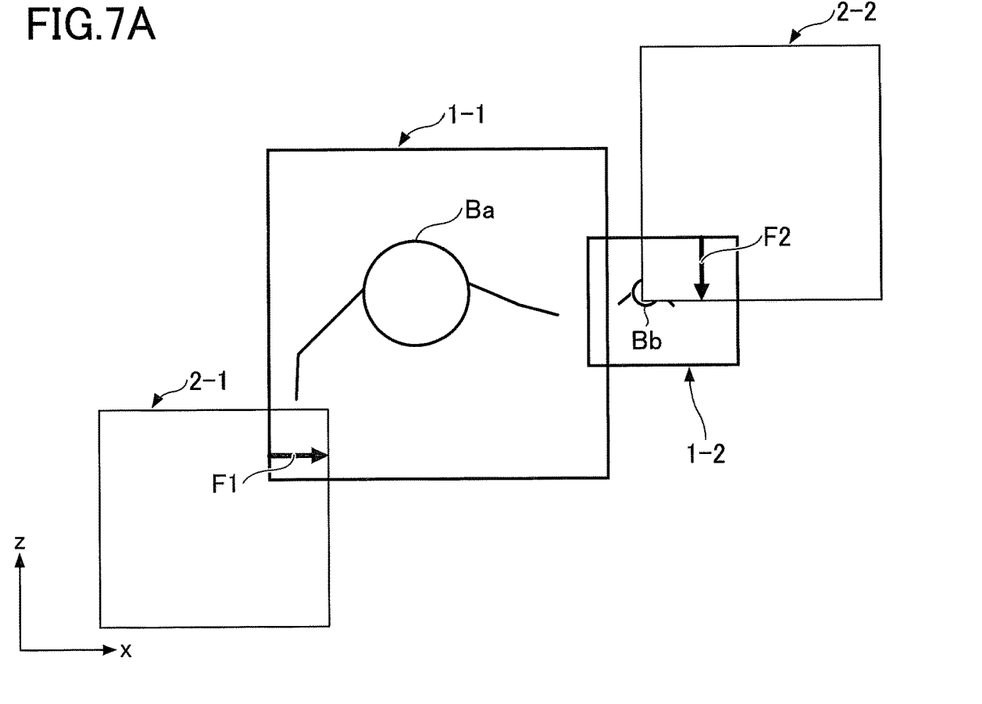
FIGS. 7A and 7B illustrate the arrangement process according to the embodiment.

The push-out force F1 and push-out force F2 are the forces applied to the opposite side of the portion in which the character areas 1-1 and 1-2 overlap the object areas 2-1 and 2-2. By pushing out the character area from the object area with the push-out force F1 and F2, the overlap between the character area and the object area is reduced.

Figure 7B:
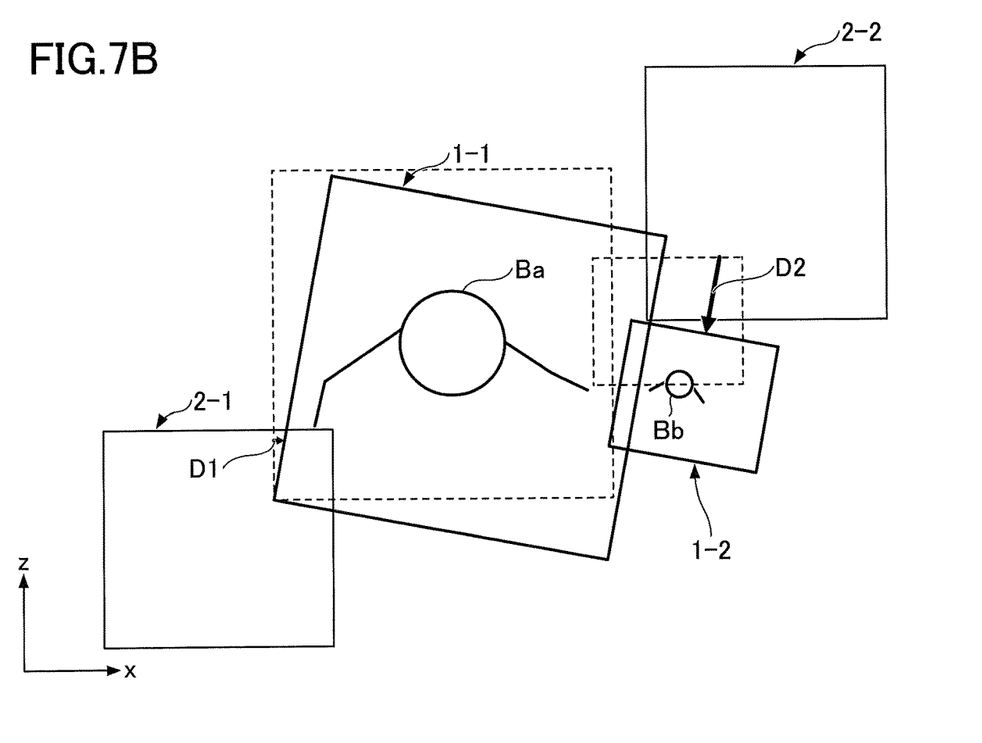

Referring back to FIG. 4, the arrangement unit 16 horizontally pushes out the character area with the computed push-out force and rearranges the character area (S18). For example, an example of the result, in which the character area 1-1 and the character area 1-2 are pushed out, is illustrated in FIG. 7B that is viewed from the upper side.

Referring back to FIG. 4, the arrangement unit 16 computes the distance (a push-out distance) in which the character area is pushed out at this time in S18 (S20). Next, the arrangement unit 16 determines whether the computed push-out distance is longer than a first threshold (S22). The first threshold is a preset value stored in the storage unit 11 and is an index for determining whether the process of horizontally pushing the character area ends. In the example of FIGS. 7A and 7B, the push-out distance when the character areas 1-1 and 1-2 are pushed out by the push-out force F1 and F2 of FIG. 7A is computed as the push-out distances D1 and D2 of FIG. 7B, and it is determined whether the longer one of the push-out distances D1 and D2 exceed the first threshold. However, it may be determined whether the average value of the push-out distances D1 and D2 exceeds the first threshold, or whether the shorter one of the push-out distances D1 and D2 exceed the first threshold.

When it is determined that the push-out distance of the character area exceeds the first threshold, the arrangement unit 16 determines whether the process of S14 to S22 is repeated more than a predetermined number of times (S24). When it is determined that the process has not been repeated the predetermined number or more, the process returns to S14 and repeats the process of S14 to S22.

In this manner, while the process of S14 to S22 is repeated, the movement of the character area in the horizontal direction (the x and z directions) is repeated in conformity with the push-out force, and the movement in the vertical direction (the y direction) is not performed. Thus, the character area is moved vertically only when overlap between the character area and the object area is unallowable even when the character area is moved horizontally the predetermined number of times.

On the other hand, when it is determined that the push-out distance of the present character area is equal to or less than the first threshold (S22) or when it is determined that the present push-out distance is repeated the predetermined number or more of times (S24), the arrangement unit 16 determines whether the overlap between the object area and the character area is larger than the second threshold (S26). The second threshold is a preset value stored in the storage unit 11 and is an index for determining whether the character area is pushed out in the vertical direction (the y direction).

When it is determined that the overlap between the object area and the character area is larger than the second threshold, the arrangement unit 16 causes the character area to be moved in the vertical (height) direction to rearrange the character area. Then, the process returns to S26. When it is determined that the overlap between the object area and the character area is equal to or less than the second threshold, the reproduction unit 17 reproduces the event (S29). Then, the present process ends. The game is resumed after this process ends. When it is detected that there is no overlap between the object area and the character area in S14, the process of reproducing the event ends.

Figure 8A:
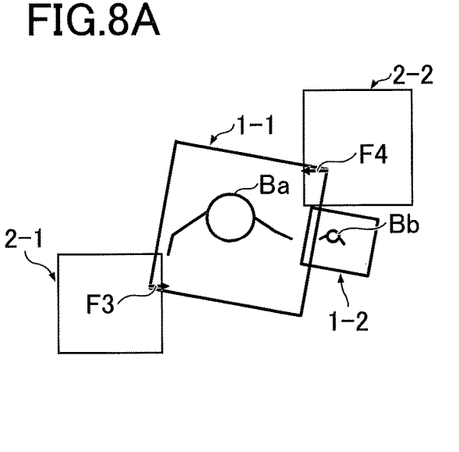
FIGS. 8A to 8F illustrate the arrangement process according to the embodiment.
Figure 8B:
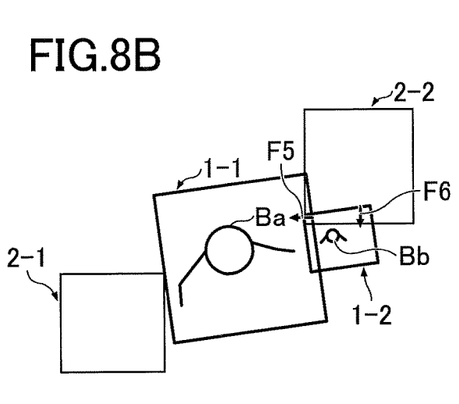
Figure 8C:
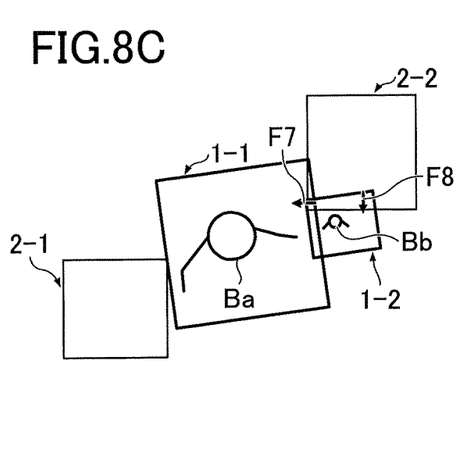
Figure 8D:
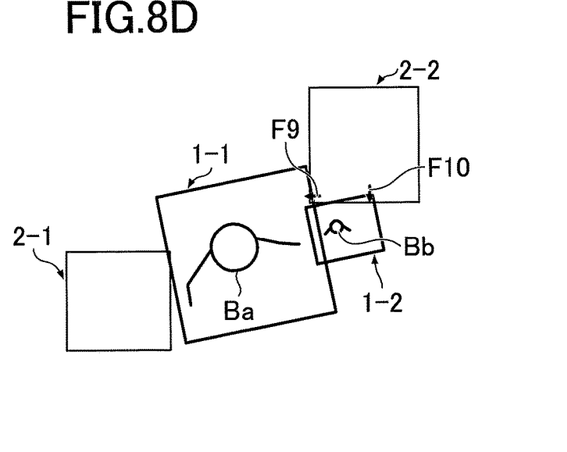
Figure 8E:
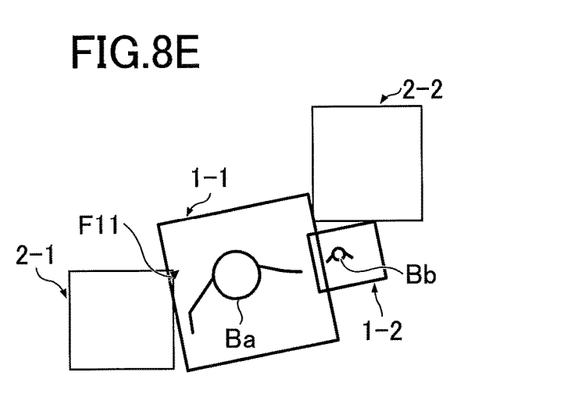
Figure 8F:
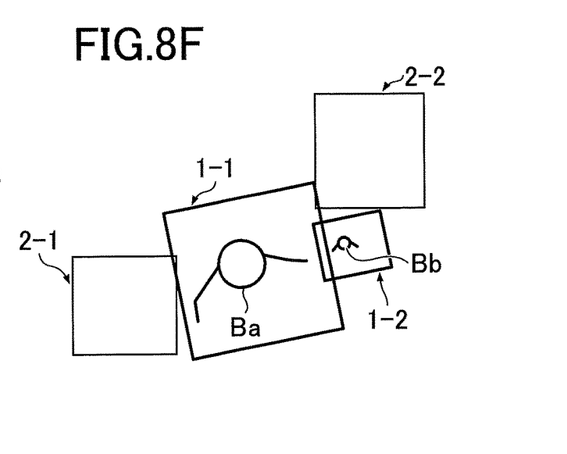

Referring to FIGS. 8A to 8F, an example of rearranging the character area is illustrated when the process of S14 to S22 of FIG. 4 is repeated the number of times that does not exceed a predetermined number of times. The push-out distance in FIG. 8A, the push-out distance in accordance with the push-out force F3 in FIG. 8B, the push-out force F5 in FIG. 8B, the push-out distance in accordance with the push-out force F6 in FIG. 8C, the push-out distance in accordance with the push-out force F7 in FIG. 8C, the push-out distance in accordance with the push-out force F8, the push-out force F9 in FIG. 8D, and the push-out distance in accordance with the push-out force F10 in FIG. 8D are all stronger than the first threshold. Meanwhile, the push-out distance based on the output F11 of FIG. 8E is less than or equal to the first threshold. In this case, by repeating the rearrangement process of the character area in S14 to S22, the overlap between the character area and the object area is in the admissible range as the time of FIG. 8E. As a result, in the placement of the character area of FIG. 8F, it is possible to render a more natural behavior scene of the character during the event reproduction without causing a collision between the character and the object.

Figure 9A:
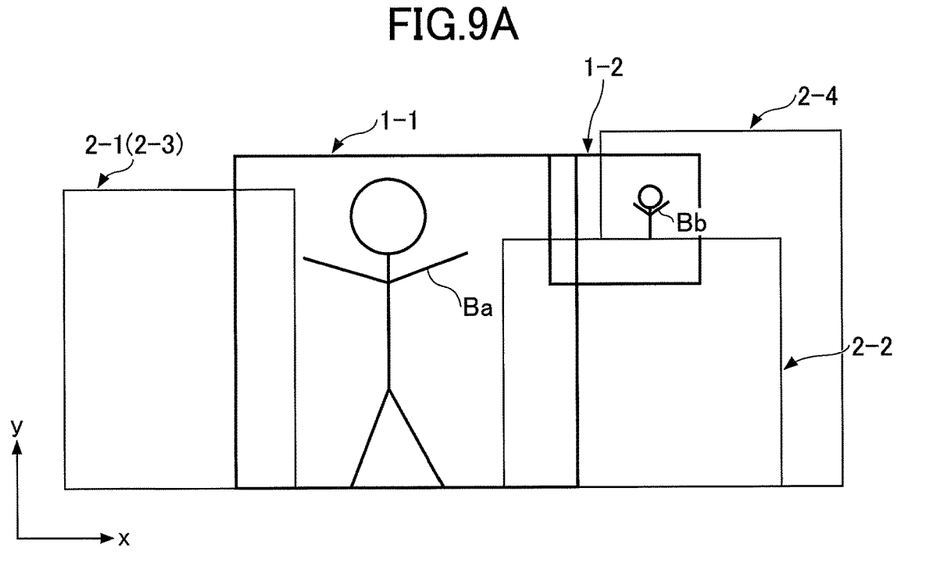
FIGS. 9A and 9B illustrate the arrangement process according to the embodiment.
Figure 9B:
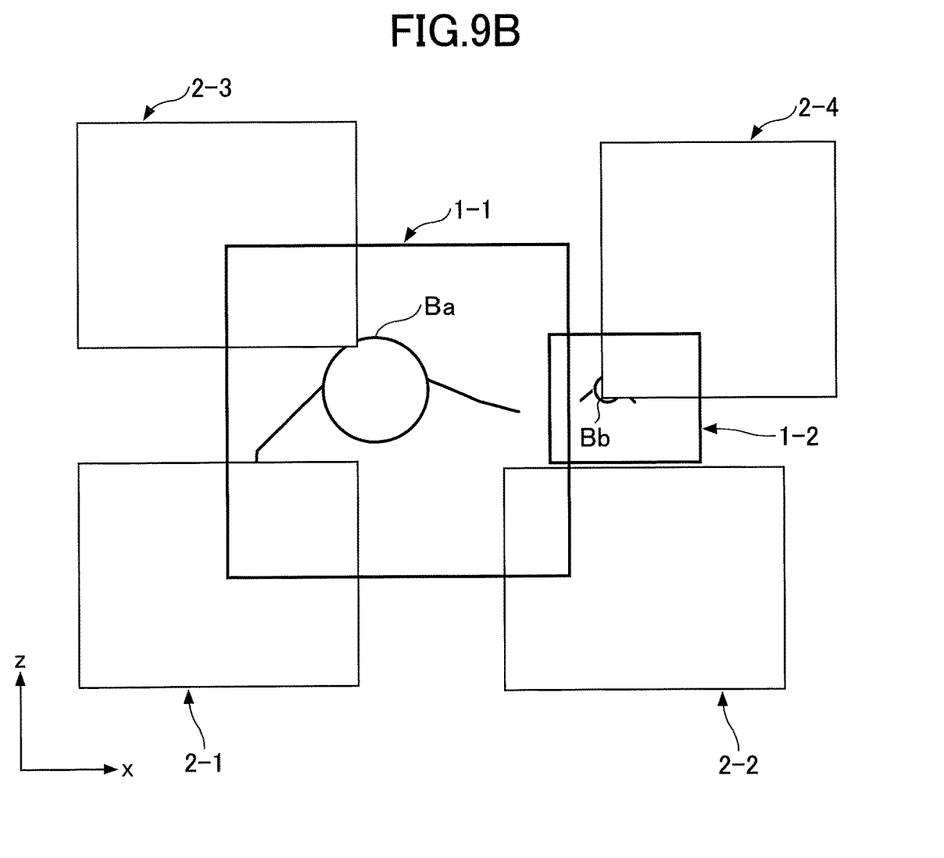

Referring to FIGS. 9A and 9B, a case where the push-out distance does not become the first threshold or less after repeating the rearrangement processes of S14 to S22 for the character areas 1-1 and 1-2 surrounded by object areas 2-1 to 2-4 the number of times not exceeding the predetermined number of times.

Figure 10:
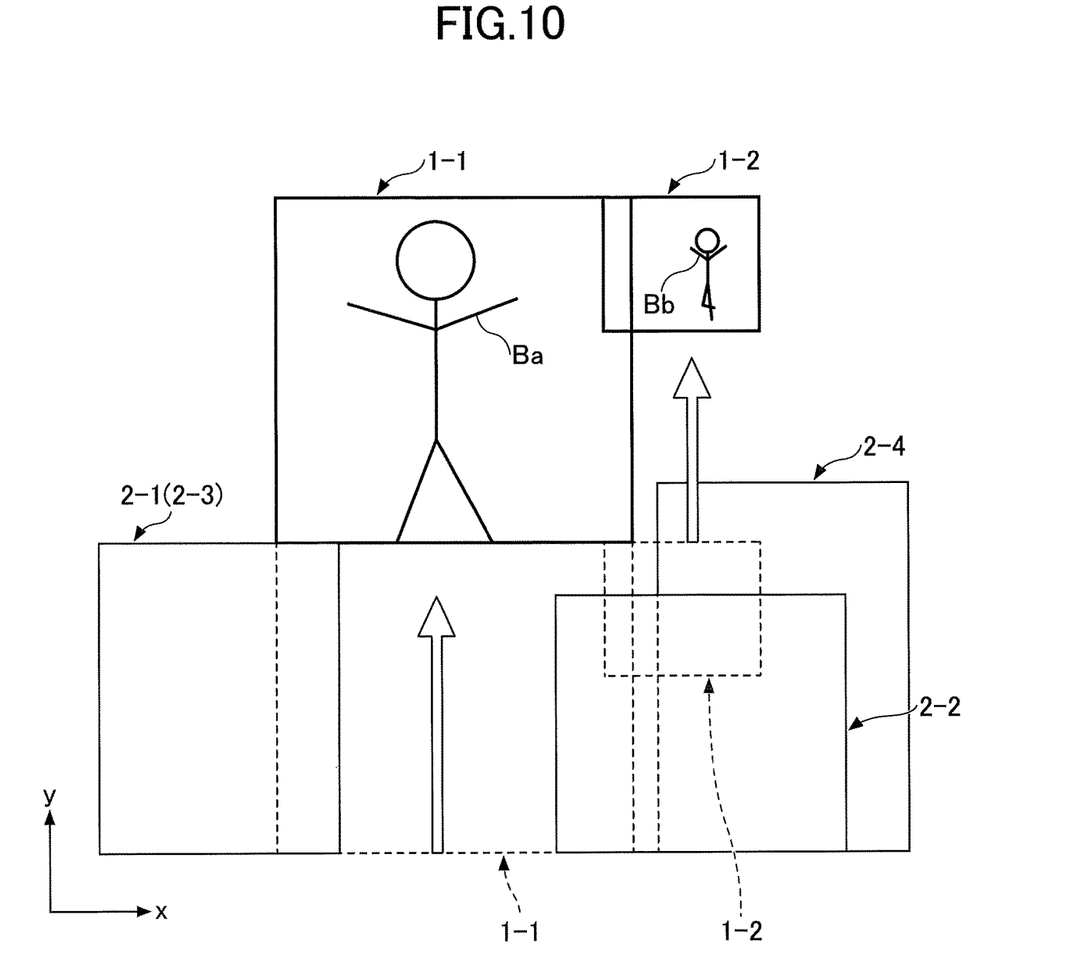
FIG. 10 illustrates the arrangement process according to the embodiment.

In this case, in S26, it is determined whether the overlap between the character area and the object area exceeds the second threshold. When it is determined that the overlap exceeds the second threshold, the character area is rearranged vertically. Accordingly, as illustrated in FIG. 10 as an example, the character areas 1-1 and 1-2 can be rearranged vertically so that overlap between the character areas and the object areas can be controlled to be the admissible range. This allows the appropriate action of the character appearing in the event of the game to be provided without the character's action colliding with the object during event playback.

In rearranging the character area, the character present in the character area may be moved in accordance with the direction of moving the character area, may be moved in the character area while performing a specific action, or may not be displayed.

Modified Example

In the arrangement process of FIG. 4 described above, an explanation has been given assuming that one event occurs in S10. However, multiple events may occur in S10. In this case, the arrangement process of FIG. 4 is performed in parallel to multiple events. The process at this time will be described with reference to FIG. 11.

Figure 11:
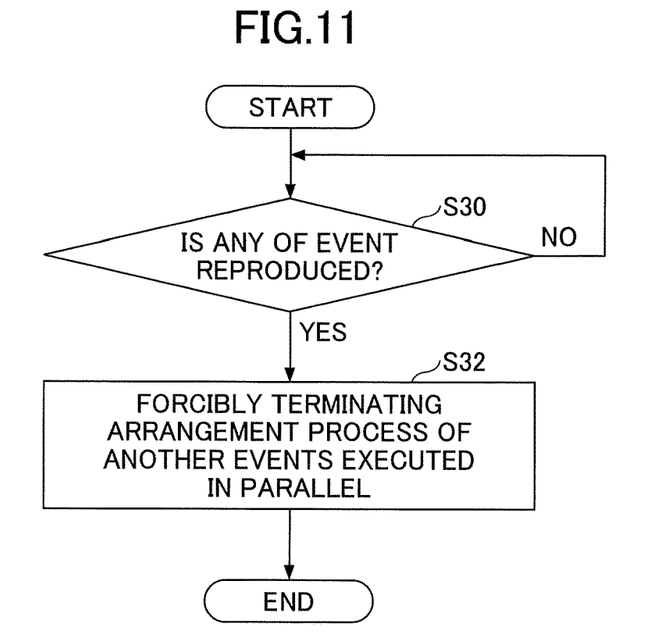
FIG. 11 illustrates an arrangement process of multiple events according to the embodiment.

The process of FIG. 11 is started when multiple events occur in the S10 of FIG. 4, and the reproduction unit 17 monitors the arrangement process in FIG. 4. The reproduction unit 17 determines whether the reproduction process in S29 is performed for any of multiple events that have occurred (S30).

When it is determined that any of the multiple events that have occurred has been reproduced, the reproduction unit 17 forcibly terminates the arrangement process (FIG. 4) of another events that have been executed in parallel (S32), excluding the reproduced event, and terminates the present process.

This causes the rearrangement of the character area of multiple events to be performed in parallel, and events other than the fastest played events are forced to terminate the arrangement process, so that only the event that was played back at the earliest can be played back. As a result, the event can be played faster to attract the player's interest while not playing the canceled event, so that the event rearranged in the vertical direction as much as possible is not reproduced.

That is, the event that rearranges the character area vertically repeats the process of S26 and S28 of FIG. 4 at least once. On the other hand, events in which character areas are rearranged horizontally and not rearranged vertically do not perform loop processing of S26 and S28. Thus, events that relocate character areas horizontally and do not relocate vertically are more likely to perform playback of the S29 event prior to the vertically repositioned event. This ensures that events rearranged as perpendicular as possible are not played back. However, if multiple events occur, multiple events may be played at any time, or only one or more events that are rearranged horizontally among multiple events may be played back.

Figure 12:
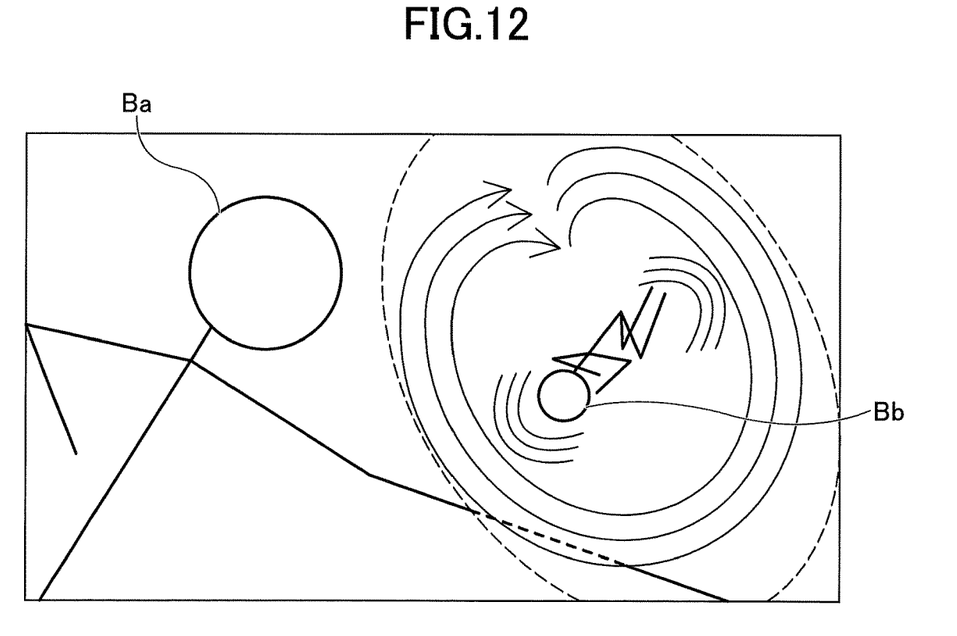
FIG. 12 illustrates an example of a screen of an example of reproduction of the event according to the embodiment.

Examples of generating multiple events include events that damage the hand of the character Ba, events that damage the ankle, and events that damage the tunnel. For each event, the arrangement process of FIG. 4 is performed in parallel, so that the placement process of an event that causes damage to the ankle and an event that causes damage to the tunnel in FIG. 11 is forcibly terminated in accordance with the fact that an event that damages the hand of the character Ba has been reproduced. Accordingly, as illustrated in FIG. 12, events that damage the hands of the character Ba are reproduced, and the rotational action of the character Bb and the action that damage the hands of the character Ba are reproduced. This provides a more appropriate action of the character that appears on the event of the game without the action of the character colliding with the object.

The information processing apparatus, arrangement method, and arrangement program according to one of the disclosed embodiments should be considered exemplary and not restrictive in all respects. The embodiments described above can be modified and improved in various forms without departing from the appended claims and the spirit thereof. The matters described in the above-described embodiments can be combined to a consistent extent with other configurations.

According to one aspect, the appropriate action of the character during event reproduction in the game can be provided.

All examples and conditional language recited herein are intended for pedagogical purposes to aid the reader in understanding the embodiments and the concepts contributed by the inventor to furthering the art, and are to be construed as being without limitation to such specifically recited examples and conditions, nor does the organization of such examples in the specification relate to a showing of superiority or inferiority of the embodiments. Although the information processing apparatus has been described in detail, it should be understood that the various changes, substitutions, and alterations could be made hereto without departing from the spirit and scope of the invention.

What is claimed is:

1. An information processing apparatus comprising:
   a specifying unit configured to specify areas in a virtual space, in which a character and an object are respectively arranged for each event in a game;
   a detection unit configured to detect an event in which the area of the object and the area of the character have an overlap that is a predetermined positional relationship;
   an arrangement unit configured to rearrange the area of the character so as to avoid the overlap, the arrangement unit computing a push-out distance obtained when the area of the character is pushed in a horizontal direction from the area of the object, in which the overlap is detected, and repeatedly rearranging, when the push-out distance is longer than a first threshold, the area of the character in the horizontal direction a predetermined number of times as a limit, the arrangement unit performing a process of rearranging the area of the character in the horizontal direction in response to the push-out distance while satisfying a condition for the process of repeatedly rearranging the area of the character, and thereafter terminating the rearranging of the area of the character when the overlap of the area of the object and the area of the character in the horizontal direction is equal to or less than the second threshold; and
   a reproduction unit configured to reproduce the event without the overlap, the reproduction unit reproducing the event after the area of the character is completely rearranged,
   wherein, when one of a plurality of events is reproduced as a result of specifying the character and executing an action of rearranging the area of the specified character in parallel for each of the produced plurality of events, the specifying unit and the arrangement unit terminate the action of rearranging another event other than the reproduced one event.

2. The information processing apparatus according to claim 1,
   wherein the arrangement unit, when the overlap of the area of the object and the area of the character in the horizontal direction is greater than the second threshold, rearranges the area of the character, in which the overlap is detected, in a vertical direction.

3. An arrangement method executed by a computer, the arrangement method comprising:
   specifying areas in a virtual space, in which a character and an object are respectively arranged for each event in a game;
   detecting an event in which the area of the object and the area of the character have an overlap that is a predetermined positional relationship;
   rearranging the area of the character so as to avoid the overlap by computing a push-out distance obtained when the area of the character is pushed in a horizontal direction from the area of the object, in which the overlap is detected, repeatedly rearranging, when the push-out distance is longer than a first threshold, the area of the character in the horizontal direction a predetermined number of times as a limit, and performing a process of rearranging the area of the character in the horizontal direction in response to the push-out distance while satisfying a condition for the process of repeatedly rearranging the area of the character, and thereafter terminating the rearranging of the area of the character when the overlap of the area of the object and the area of the character in the horizontal direction is equal to or less than the second threshold; and
   reproducing the event without the overlap by reproducing the event after the area of the character is completely rearranged,
   wherein, when one of a plurality of events is reproduced as a result of specifying the character and executing an action of rearranging the area of the specified character in parallel for each of the produced plurality of events, and terminating the action of rearranging another event other than the reproduced one event.

4. An arrangement program causing a computer to execute a process comprising:
   specifying areas in a virtual space, in which a character and an object are respectively arranged for each event in a game;
   detecting an event in which the area of the object and the area of the character have an overlap that is a predetermined positional relationship;
   rearranging the area of the character so as to avoid the overlap by computing a push-out distance obtained when the area of the character is pushed in a horizontal direction from the area of the object, in which the overlap is detected, repeatedly rearranging, when the push-out distance is longer than a first threshold, the area of the character in the horizontal direction a predetermined number of times as a limit, and performing a process of rearranging the area of the character in the horizontal direction in response to the push-out distance while satisfying a condition for the process of repeatedly rearranging the area of the character, and thereafter terminating the rearranging of the area of the character when the overlap of the area of the object and the area of the character in the horizontal direction is equal to or less than the second threshold; and reproducing the event without the overlap by reproducing the event after the area of the character is completely rearranged, wherein, when one of a plurality of events is reproduced as a result of specifying the character and executing an action of rearranging the area of the specified character in parallel for each of the produced plurality of events, and terminating the action of rearranging another event other than the reproduced one event.

* * * * *